United States Patent [19]

Owen et al.

[11] Patent Number: 5,435,776
[45] Date of Patent: Jul. 25, 1995

[54] POULTRY STUNNING WITH CARBON DIOXIDE

[75] Inventors: Richard L. Owen, Hinsdale; Jose Maria N. Camacho, Orland Park; Timothy M. Lewis, Chicago; Jim M. Venetucci, Forest Park, all of Ill.

[73] Assignee: Liquid Carbonic Corporation, Oak Brook, Ill.

[21] Appl. No.: 278,399

[22] Filed: Jul. 21, 1994

[51] Int. Cl.$^6$ ................................................ A22B 3/00
[52] U.S. Cl. ............................................................... 452/66
[58] Field of Search ................................... 452/66, 57

[56] References Cited

U.S. PATENT DOCUMENTS

| | | | |
|---|---|---|---|
| 2,737,683 | 5/1954 | Regensburger | 452/66 |
| 2,978,737 | 4/1961 | Hughes | 452/66 |
| 4,107,818 | 8/1978 | Scott et al. | 452/66 |
| 5,112,270 | 5/1992 | Howard et al. | 452/66 |
| 5,152,714 | 10/1992 | Audsley et al. | 452/66 |

OTHER PUBLICATIONS

"Carbon Dioxide Immobilization of Turkeys Before Slaughter"; U.S. Dept. of Agriculture—Feb., 1955.

*Primary Examiner*—Willis Little
*Attorney, Agent, or Firm*—Fitch, Even, Tabin & Flannery

[57] ABSTRACT

The present invention is directed to a method for treatment of poultry prior to slaughter of the poultry. In the method, poultry are exposed to a first atmosphere having a carbon dioxide concentration sufficient to induce relaxation of the poultry for a period of time sufficient to effect the relaxation. The relaxed poultry are then immediately exposed to a second atmosphere having a carbon dioxide concentration sufficient to render the poultry unconscious. The poultry are subjected to the second atmosphere for a period of time sufficient to effect the unconsciousness, but not sufficient to kill the poultry by being exposed to the second carbon dioxide atmosphere. The poultry are then slaughtered prior to the poultry regaining consciousness.

10 Claims, No Drawings

POULTRY STUNNING WITH CARBON DIOXIDE

FIELD OF THE INVENTION

The present invention relates generally to a method for the treatment of poultry prior to slaughter so as to produce carcasses with improved properties. More particularly, the present invention relates to a method for the treatment of poultry with a carbon dioxide atmosphere prior to slaughter under conditions whereby the poultry are relaxed and made unconscious prior to slaughter, but under such conditions that the poultry do not die from the carbon dioxide atmosphere prior to slaughter.

BACKGROUND OF THE INVENTION

The use of carbon dioxide for the pre-slaughter stunning of poultry was first proposed in the mid-1950's, Drewniak, et al., 1955, U.S.D.A. Circular 1958. The first commercial-scale, in-line gas stunner was designed a few years later, Kotula, et al., 1961, *Poultry Sci.*, 40:213. However, technological limitations of the time combined with the development of cheaper electrical stunners that met the existing needs of processors, prevented further use of gas stunning by the poultry industry.

The electrical stunning procedure involves removing birds from a transport crate, individually shackling them by their legs, conveying each shackled bird to an electric stunning bath in which the head of the bird is immersed in water, which acts as a live electrode, and current passes through the bird to ground via the shackle. The electric stunning process causes electroplectic convulsions which result in hemorrhaging in the muscles of the breast and legs and broken bones in the carcasses, particularly in the collar regions. These conditions lead to downgrading of poultry carcasses.

More recently, U.S. Pat. No. 5,152,714 to Audsley, et al. describes a method for treatment of poultry by exposure to an atmosphere depleted in oxygen for a sufficient period of time to cause the poultry to undergo what is described as anoxic convulsions. In actuality, the convulsions are clonic convulsions which are induced by anoxia, i.e., deprivation of oxygen. As stated in the Audsley, et al. patent, "it is very much preferred to effect slaughter by subjecting them [the poultry] to the atmosphere for a sufficiently long period of time for the poultry to die". The conditions described in the Audsley, et al. patent would indeed result in death of the poultry of the size being treated in the Audsley, et al. patent under the time and inert gas concentrations utilized.

In accordance with the present invention, it has been determined that it is highly beneficial to avoid clonic convulsions prior to slaughter of poultry. In accordance with the present invention, the poultry are subjected to conditions sufficient to effect relaxation of the poultry and further conditions sufficient to render the poultry unconscious prior to slaughter.

SUMMARY OF THE INVENTION

The present invention is directed to a method for treatment of poultry prior to slaughter of the poultry. In the method, poultry are exposed to a first atmosphere having a carbon dioxide concentration sufficient to induce relaxation of the poultry for a period of time sufficient to effect the relaxation. The relaxed poultry are then immediately exposed to a second atmosphere having a carbon dioxide concentration sufficient to render the poultry unconscious. The poultry are subjected to the second atmosphere for a period of time sufficient to effect the unconsciousness, but not sufficient to kill the poultry by being exposed to the second carbon dioxide atmosphere. The poultry are then slaughtered prior to the poultry regaining consciousness.

DETAILED DESCRIPTION OF THE INVENTION

In accordance with the present invention, it has been determined that improved poultry carcass quality can be attained if the poultry are first relaxed and then rendered unconscious by subjecting the poultry to treatment in two separate atmospheres containing carbon dioxide. In the first atmosphere, the carbon dioxide is present at a level of from about 35% to about 45%, preferably 40%. In the second higher carbon dioxide atmosphere wherein the poultry are rendered unconscious, the carbon dioxide is present at a level of from about 50% to about 60%. Percentages used herein are by volume unless otherwise indicated.

It has been determined that the weight of the poultry is the determining factor as to how long the poultry should be subjected to the two separate carbon dioxide atmospheres. As set forth hereinbelow in Table 1, the total treatment times vary from about 20 to about 35 seconds for poultry weighing 2¾ pounds to 4½ pounds to a total treatment time of from about 160 seconds to about 200 seconds for poultry weighing from 30 to 50 pounds.

TABLE 1

| Weight Range of Poultry in Pounds | Time in First Atmosphere 35–45 v/o $CO_2$ | Time in Second Atmosphere 50–60 v/o $CO_2$ |
| --- | --- | --- |
| 2.75–4.5 | 10–15 seconds | 10–15 seconds |
| 4.5–12 | 14–45 seconds | 14–45 seconds |
| 12–16 | 45–60 seconds | 45–60 seconds |
| 16–30 | 60–80 seconds | 60–80 seconds |
| 30–50 | 80–100 seconds | 80–100 seconds |

The two carbon dioxide atmospheres are preferably contiguous and the treatment is preferably performed continuously by passing shackled birds on a conveyor through a tunnel containing the two atmospheres.

After the poultry are rendered unconscious in the second carbon dioxide atmosphere, the poultry are preferably slaughtered as soon after leaving the carbon dioxide atmosphere as possible to prevent the poultry from regaining consciousness. Preferably, the poultry are slaughtered within 10 seconds after leaving the second carbon dioxide atmosphere and most preferably the poultry are slaughtered within 5 seconds after leaving the second carbon dioxide atmosphere.

The following example further illustrates various features of the invention, but is intended to in no way limit the scope of the invention as set forth in the appended claims.

EXAMPLE 1

Chicken broilers were relaxed and rendered unconscious by the method of the invention. The chicken broilers weighed an average of about 5 pounds. The chicken broilers were shackled to a conveyor belt and transferred through a 15 foot long tunnel. In the first half of the tunnel, a carbon dioxide atmosphere of 40 volume percent carbon dioxide was maintained. The transit time through the first section of the tunnel was 12.5 seconds. The second half of the tunnel was maintained with an atmosphere of 55% carbon dioxide. The transit time through the second half of the tunnel was 2.5 seconds.

The poultry was observed during passage through the tunnel. In the first section of the tunnel, the poultry ceased struggling and wing flapping and gave the appearance of being relaxed. As the poultry passed through the second section of the tunnel, the poultry gradually became unconscious and were unconscious as they exited from the end of the tunnel.

After exiting from the end of the tunnel, the poultry were slaughtered within 10 seconds by standard neck cutting. After being plucked, eviscerated and chilled for a period of 4 hours, the poultry were divided into standard 8 section cuts. The tenderness of the chicken cuts was evaluated against those which had been stunned by electric stunning and poultry which had been slaughtered by exposure to a carbon dioxide atmosphere. The quality, tenderness and incidence of broken bones was substantially better using the method of the present invention for rendering poultry unconscious than was attained through use of electric stunning or slaughtering of the poultry in a carbon dioxide atmosphere.

What is claimed is:

1. A method for treatment of poultry comprising exposing poultry to a first atmosphere having a carbon dioxide concentration of from about 35% to about 45% by volume of carbon dioxide which is sufficient to induce relaxation of said poultry for a period of time of from about 10 to about 15 seconds for poultry which weigh from about 2.75 pounds to about 4.5 pounds which is sufficient to effect said relaxation, immediately exposing said relaxed poultry to a second atmosphere having a higher carbon dioxide concentration of from about 50% to about 60% by volume of carbon dioxide which is sufficient to render said poultry unconscious for a period of time of from about 10 to about 15 seconds for poultry which weigh from about 2.75 pounds to about 4.5 pounds which is sufficient to effect said unconsciousness, but not sufficient to kill said poultry by being exposed to said carbon dioxide atmosphere and thereafter slaughtering said poultry prior to said poultry regaining consciousness.

2. A method in accordance with claim 1 wherein said exposure time in said first atmosphere is from about 15 to about 45 seconds for poultry which weight from about 4.5 to about 12 pounds.

3. A method in accordance with claim 1 wherein said exposure time in said first atmosphere is from about 45 to about 60 seconds for poultry which weigh from about 12 to about 16 pounds.

4. A method in accordance with claim 1 wherein said exposure time in said first atmosphere is from about 60 to about 80 seconds for poultry which weigh from about 16 to about 30 pounds.

5. A method in accordance with claim 1 wherein said exposure time in said first atmosphere is from about 80 to about 100 seconds for poultry which weight from about 30 to about 50 pounds.

6. A method in accordance with claim 1 wherein said exposure time in said second atmosphere is from about 15 to about 45 seconds for poultry which weigh from about 4.5 to about 12 pounds.

7. A method in accordance with claim 1 wherein said exposure time in said second atmosphere is from about 45 to about 60 seconds for poultry which weigh from about 12 to about 16 pounds.

8. A method in accordance with claim 1 wherein said exposure time in said second atmosphere is from about 60 to about 80 seconds for poultry which weigh from about 16 to about 30 pounds.

9. A method in accordance with claim 1 wherein said exposure time in said second atmosphere is from about 80 to about 100 seconds for poultry which weigh from about 30 to about 50 pounds.

10. A method in accordance with claim 1 wherein said poultry is slaughtered within about 10 seconds after leaving said second atmosphere.

* * * * *